(12) United States Patent
Takeda et al.

(10) Patent No.: US 7,456,519 B2
(45) Date of Patent: Nov. 25, 2008

(54) POWER CONVERSION SYSTEM

(75) Inventors: Kenji Takeda, Hitachi (JP); Masaya Ichinose, Hitachiota (JP); Motoo Futami, Hitachiota (JP); Masahiro Komachiya, Hitachinaka (JP)

(73) Assignee: Hitachi, Ltd., Tokyo (JP)

( * ) Notice: Subject to any disclaimer, the term of this patent is extended or adjusted under 35 U.S.C. 154(b) by 409 days.

(21) Appl. No.: 11/058,355

(22) Filed: Feb. 16, 2005

(65) Prior Publication Data

US 2006/0023478 A1    Feb. 2, 2006

(30) Foreign Application Priority Data

Jul. 29, 2004    (JP) ............... 2004-221681

(51) Int. Cl.
*H02J 7/00*    (2006.01)
(52) U.S. Cl. .............................. 307/64; 307/65; 307/66
(58) Field of Classification Search .................. 307/64, 307/65, 66
See application file for complete search history.

(56) References Cited

U.S. PATENT DOCUMENTS

| | | | |
|---|---|---|---|
| 6,215,272 B1 * | 4/2001 | Ohara et al. .............. 320/104 |
| 6,440,598 B1 * | 8/2002 | Fukui et al. ................. 429/34 |
| 6,487,096 B1 * | 11/2002 | Gilbreth et al. .............. 363/35 |
| 7,117,044 B2 * | 10/2006 | Kocher et al. ................. 700/34 |
| 2004/0217831 A1 * | 11/2004 | Bauer et al. ................. 335/202 |

FOREIGN PATENT DOCUMENTS

| | | |
|---|---|---|
| EP | 0546652 A1 * | 6/1993 |
| JP | 0546652 * | 6/1993 |
| JP | 11-191424 | 7/1999 |
| JP | 2002-63927 | 2/2002 |
| JP | 2003-163013 | 6/2003 |
| JP | 2003-217625 | 7/2003 |
| JP | 2004-193063 | 7/2004 |

\* cited by examiner

*Primary Examiner*—Stephen W Jackson
*Assistant Examiner*—Christopher J Clark
(74) *Attorney, Agent, or Firm*—Antonelli, Terry, Stout & Kraus, LLP.

(57) ABSTRACT

A power conversion system includes a power generating apparatus, an auxiliary generation device that consumes power, an auxiliary-devised power source, a secondary battery device chargeable and dischargeable with power generated by the power generating apparatus, a bilateral DC/AC inverter that causes the power generating apparatus to cooperate with a commercial AC power source, and a switch unit provided between the commercial AC power source and the bilateral DC/AC inverter, DC terminals of the bilateral DC/AC inverter and an input of the auxiliary-devised power source, when the power generating apparatus generates no power, the switch unit is opened, the bilateral DC/AC inverter is stopped, and the voltage supplied from the secondary battery device to the auxiliary-devised power source is lower than that supplied from the secondary battery device to the auxiliary-devised power source when the power generating apparatus generates power.

14 Claims, 3 Drawing Sheets

FIG.5
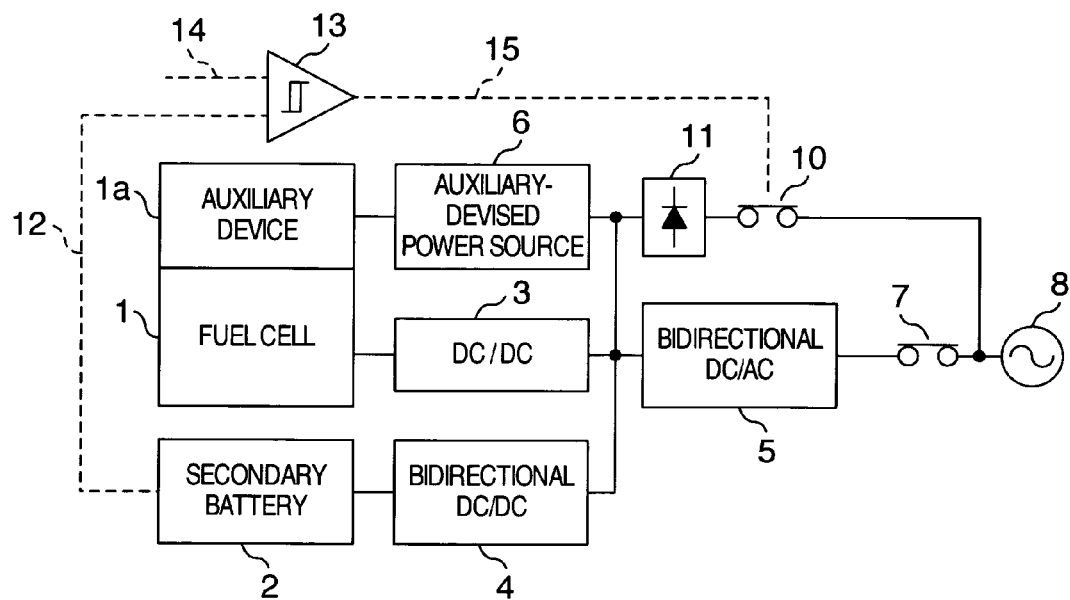
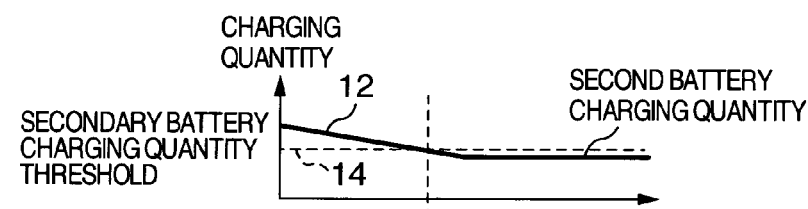
FIG.6A
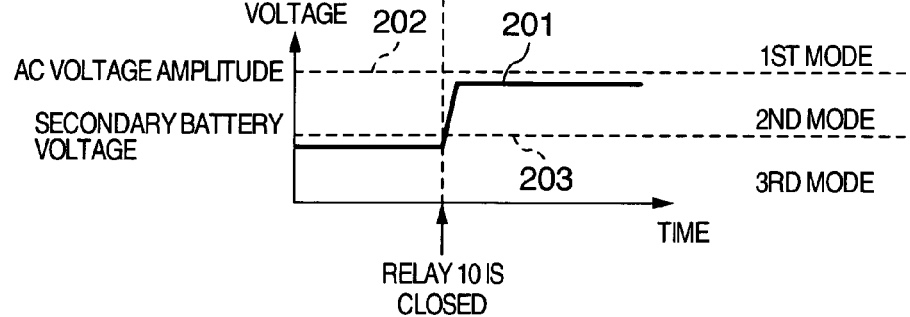
FIG.6B

POWER CONVERSION SYSTEM

BACKGROUND OF THE INVENTION

The present invention relates to a power conversion system in liaison with a power generating apparatus to cooperate with a commercial AC power source.

Recently, use of distributed power sources has been studied as a power source for housing. A fuel cell directly converts chemical energy to electric energy, which causes high conversion efficiency. A method of restraining power to be supplied to the housing and reducing electric charges has been studied by charging and discharging power generated by the fuel cell to and from a secondary battery.

JP-A-2002-63927 describes an example of a system for supplying power from a secondary battery to the housing when power failure has occurred during a time from starting the fuel cell to starting its power generation.

As disclosed in JP-A-2002-63927, however, a method of connecting the commercial AC power source with the secondary battery through a cooperative inverter and an AC/DC converter, needs to maintain the voltage of secondary battery at a high voltage enough for system cooperation. Thus, this method cannot be restrained a possible power loss occurring in an auxiliary-devised power source supplying circuit when the fuel cell generates no power.

SUMMARY OF THE INVENTION

It is therefore an object of the present invention to restrain a possible power loss occurring in a path through which the power is supplied from the secondary battery to the auxiliary-devised power source when the fuel cell generates no power.

According to the present invention, there is provided a power conversion system comprising: a power generating apparatus; an auxiliary generation device that consumes power when the power generating apparatus is started up; an auxiliary-devised power source that supplies a desired voltage to the auxiliary generation device; a secondary battery device chargeable and dischargeable with power generated by the power generating apparatus; a bilateral DC/AC inverter in liaison with the power generating apparatus to cooperate with a commercial AC power source; and a switch unit provided between the commercial AC power source and the bilateral DC/AC inverter, in which DC terminals of the bilateral DC/AC inverter and an input of the auxiliary-devised power source being connected to the outputs of the power generating apparatus and the secondary battery device, when the power generating apparatus generates no power, the switch unit is opened, the bilateral DC/AC inverter is stopped, and the voltage supplied from the secondary battery device to the auxiliary-devised power source is lower than that supplied from the secondary battery device to the auxiliary-devised power source when the power generating apparatus generates power.

According to the present invention, when the power generating apparatus generates no power, the secondary battery supplies the auxiliary-devised power source with power necessary for the auxiliary-devised power source with low loss.

Other objects, features and advantages of the invention will become apparent from the following description of the embodiments of the invention taken in conjunction with the accompanying drawings.

BRIEF DESCRIPTIONS OF THE DRAWINGS

FIG. 5 illustrates an arrangement of a third example of the power conversion system according to the present invention; and FIGS. 6A and 6B illustrate changes in the input voltage to an auxiliary-devised power source in the third example of the power conversion system.

DETAILED DESCRIPTION OF THE EMBODIMENTS

Figure 1:
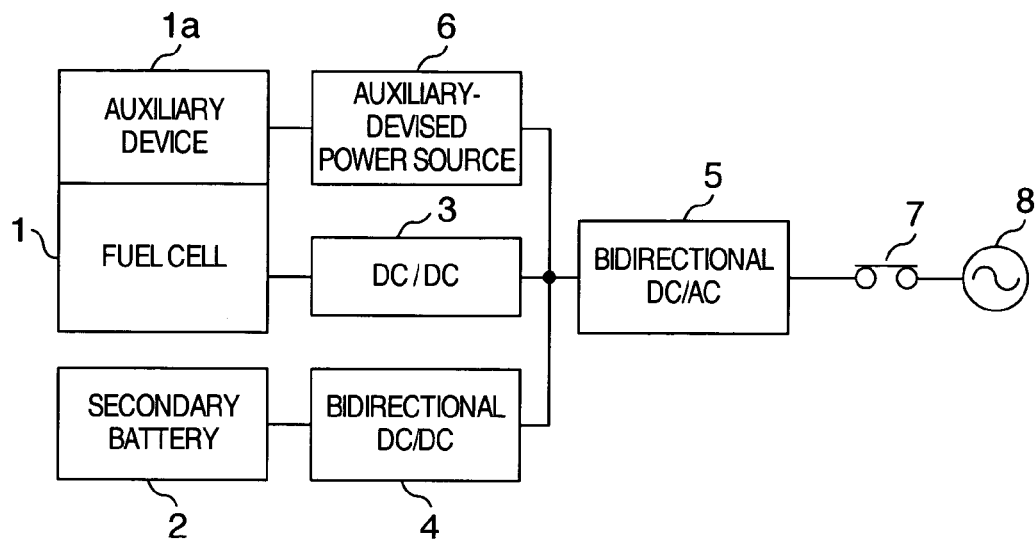
FIG. 1 illustrates an arrangement of a first example of the power conversion system according to the present invention.

Referring to FIG. 1, the first example of the power conversion system according to the present invention will be described. Herein, a household fuel cell system that achieves cooperation between a fuel cell and the commercial AC power source will be given as an example of the power conversion system.

The power conversion system of this example includes a fuel cell 1, a secondary battery 2, a DC/DC converter 3 connected to the fuel cell 1 to control an output generated from the fuel cell 1, a bilateral DC/DC converter 4 connected to the secondary battery 2 to control charge/discharge of the secondary battery 2, a bilateral DC/AC inverter 5 connected to a merging point of the outputs of the unilateral and bilateral DC/DC converters 3 and 4, an auxiliary device 1a belonging to the fuel cell 1, and an auxiliary-devised power source 6 for supplying a power of desired voltage to the auxiliary device 1a, and a switch unit 7 that connects and disconnects the bilateral DC/AC inverter 5 to and from the commercial AC power source 8.

The fuel cell 1 may be of a polymerelectrolyte or solid oxide type. The output voltage from the fuel cell 1 is, for example, a DC 40 to 80 volts.

The secondary battery 2 may be any chargeable/dischargeable one such as a lead-acid battery, a lithium ion battery, a nickel-hydrogen battery or an electric double-layer capacitor. The output voltage from the secondary battery 2 is, for example, a DC 100 to 200 volts.

When the fuel cell 1 generates power, the secondary battery 2 is charged with power generated by the fuel cell 1. When the fuel cell 1 generates no power, the secondary battery 2 is charged with power supplied by the commercial AC power source 8 via the bilateral DC/AC inverter 5 and the bilateral DC/DC converter 4. The commercial AC power source 8 is of a 100V/200V single-phase 3-line system type.

The auxiliary device 1a includes a gas pump, a liquid pump, a temperature increasing heater, a laid-pipe switching electromagnetic valve, a system control microcomputer, etc. The auxiliary-devised power source 6 always supplies different constant DC voltages, for example, of 5, 15, 24 volts, etc., even when its input voltage changes.

Figure 2:
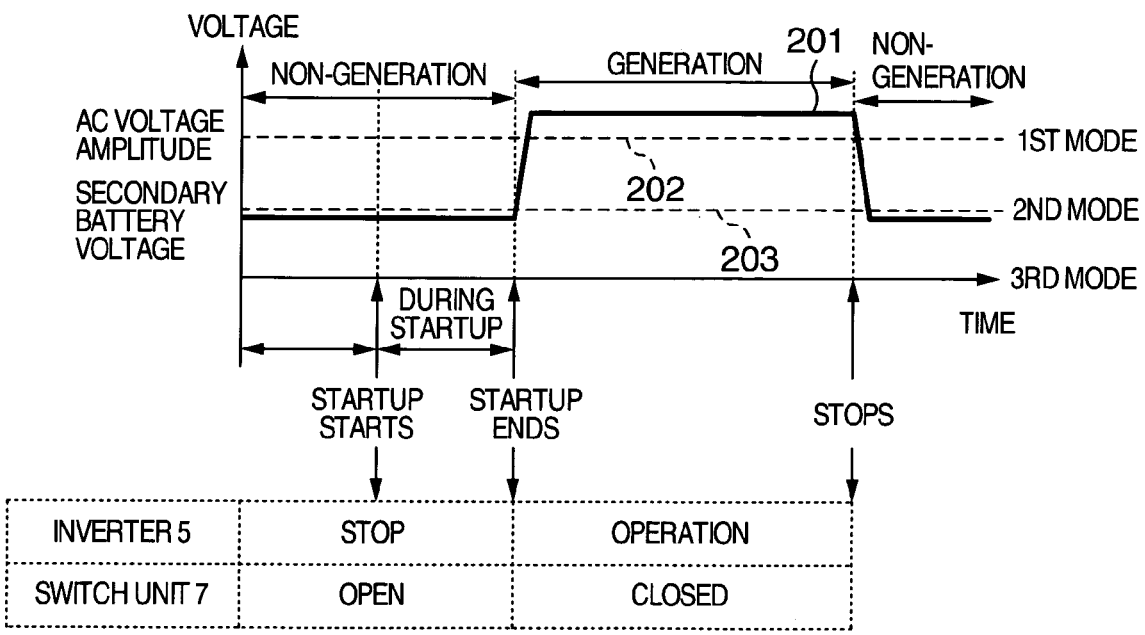
FIG. 2 illustrates changes in an input voltage to an auxiliary-devised power source in the first example of the power conversion system.

Then, referring to FIG. 2 the input voltage to the auxiliary-devised power source 6 in the first example of the power conversion system will be described. A solid line 201 in FIG. 2 represents the input voltage to the auxiliary-devised power source 6;

a broken line 202 an AC amplitude of the commercial AC power source 8; and a second broken line 203 the output voltage from the secondary battery 2. When the fuel cell 1 generates power, the output power from the fuel cell 1 and the secondary battery 2 is supplied to the auxiliary-devised power source 6. When the fuel cell 1 generates no power, the output power from the secondary battery 2 is supplied to the auxiliary-devised power source 6.

When the fuel cell 1 generates power, the switch unit 7 is closed such that the bilateral DC/AC inverter 5 cooperates with the commercial AC power source 8. The output power from the fuel cell 1 is connected via the bilateral DC/AC inverter 5 to the commercial AC power source 8.

The input voltage to the bilateral DC/AC inverter 5 requires substantially a DC 300 to 400 volts that is not less than the AC amplitude of the commercial AC power source 8. Thus, the DC/DC converters 3 and the bilateral DC/DC converter 4 convert their input voltage to a DC 300 to 400 volts.

More particularly, the DC/DC converter 3 converts a DC 40 to 80 volts of the output voltage from the fuel cell 1 to a DC 300 to 400 volts whereas the bilateral DC/DC converter 4 converts a DC 100 to 200 volts of the output voltage from the secondary battery 2 to a DC 300 to 400 volts. At this time, the DC 300 to 400 volts is applied to the auxiliary-devised power source 6 connected to the input of the bilateral DC/AC inverter 5.

When the fuel cell 1 generates no power; that is, when the fuel cell is on standby or during startup, it cannot supply power to the auxiliary-devised power source 6. Thus, the secondary battery 2 supplies power via the bilateral DC/DC converter 4 to the auxiliary-devised power source 6, thereby compensating for power consumed by the auxiliary device 1a. When the switch unit 7 is opened, the bilateral DC/AC inverter 5 is stopped and cooperation of the system with the commercial AC power source 8 is cut off. Thus, a power loss occurring due to driving of the bilateral DC/AC inverter 5 is reduced. When the bilateral DC/AC inverter 5 is not driven, the input voltage to the bilateral DC/AC inverter 5 does not necessarily require 300 to 400 volts. Thus, the input voltage to the auxiliary-devised power source 6 can be set to a low voltage compared to that in the power generation of the fuel cell 1. When the fuel cell 1 generates no power, the secondary battery 2 is required to supply its output voltage to the auxiliary-devised power source 6. In this case, the bilateral DC/DC converter 4 does not need to be driven, thereby further reducing a possible power loss. That is, according to this example, when the fuel cell 1 generates no power, the bilateral DC/AC inverter 5 and the bilateral DC/DC converter 4 are stopped, thereby reducing a possible power loss.

In FIG. 2, in order that a current flows from the secondary battery 2 to the auxiliary-devised power source 6 when the fuel cell 1 generates no power, the input voltage (shown by a solid line) to the auxiliary-devised power source 6 must be lower than the output voltage (shown by a broken line) from the secondary battery 2. Actually, a voltage loss occurs in the bilateral DC/DC converter 4. Thus, the input voltage to the auxiliary-devised power source 6 must be lower than the output voltage from the bilateral DC/DC converter 4.

A first, second and a third mode represent that the input voltage to the auxiliary-devised power source 6 is not less than the AC amplitude of the commercial AC power source 8, that it is less than the AC amplitude of the commercial AC power source 8 and not less than the voltage of the secondary battery 2, and that it is less than the voltage of the secondary battery 2, respectively. In the first mode, the fuel cell 1 generates power; and in the second or third mode, the fuel cell 1 generates no power.

Figure 3:
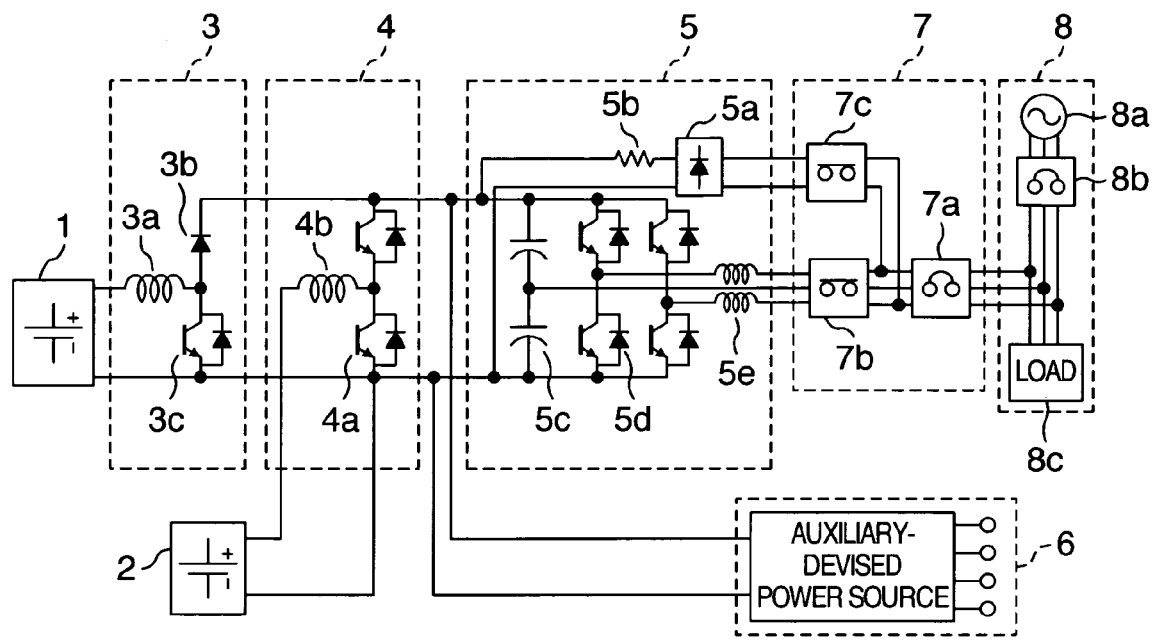
FIG. 3 illustrates an electrical circuit of the first example of the power conversion system.

FIG. 3 illustrates an electric system diagram of the first example of the FIG. 1 power conversion system. The DC/DC converter 3 of this example includes a step-up chopper circuit of a reactor 3a, a pair of diodes 3b and a semiconductor switch 3c. In addition to the chopper circuit, the DC/DC converter 3 may be a voltage converter circuit in which the DC voltage conversion is performed by switching a semiconductor switch included; for example, an insulated type converter using a high frequency transformer. The bilateral DC/DC converter 4 of this example includes a bilateral chopper circuit of two series-connected semiconductor switches 4a and a reactor 4b. The bilateral DC/AC inverter 5 of this example includes an initial charging circuit composed of a rectifier 5a and a resister 5b; a pair of smoothing capacitors 5c, a pair of semiconductor switches 5d, and a pair of filtering reactors 5e. The switch means 7 of this example includes a system cooperation breaker 7a, an AC cooperation relay 7b, and an initial charging circuit relay 7c. The commercial AC power source 8 includes a commercial power system 8a, a household distribution board 8b, and a household power load 8c. Input and output terminals of the auxiliary-devised power source 6 are connected to the input terminals of the bilateral DC/AC inverter 5 and the auxiliary device, respectively.

In the first example of the power conversion system, when the fuel cell 1 generates power, the fuel cell 1 and the secondary battery 2 supply power to the auxiliary-devised power source 6. When the fuel cell 1 generates no power, the secondary battery 2 supplies power to the auxiliary-devised power source 6. By changing the input voltage to the auxiliary-devised power source 6 like this, the power is supplied from the secondary cell 2 to the auxiliary-devised power source 6 with high efficiency.

Figure 4:
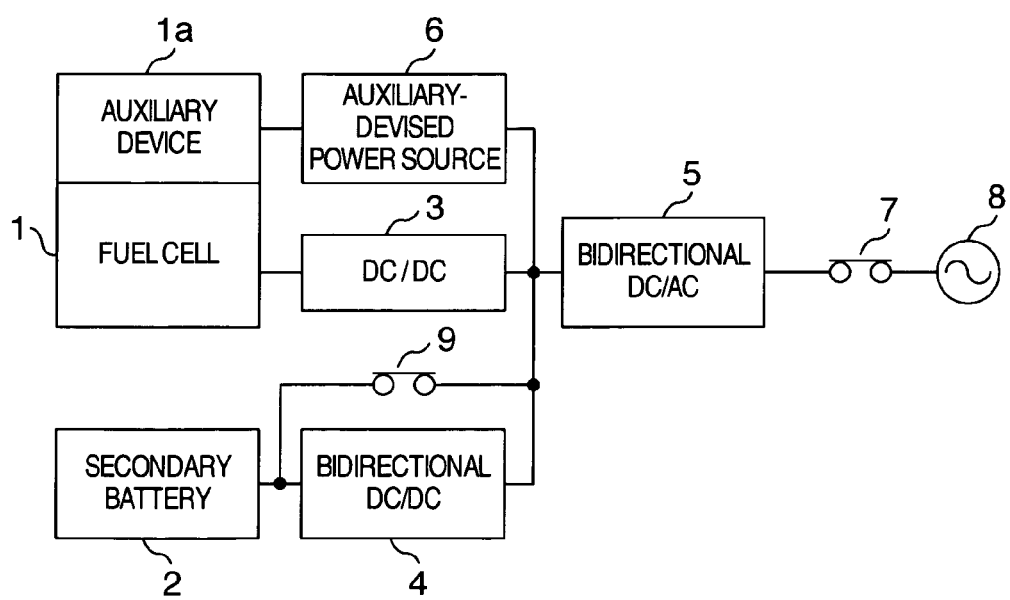
FIG. 4 illustrates an arrangement of a second example of the power conversion system according to the present invention.

Referring to FIG. 4, a second example of the power conversion system according to the present invention will be described next. In comparison with FIG. 1 of the first example of the power conversion system, the power conversion system of the second example is different from the first one in that a relay 9 is added to making short-circuit at both ends of the bilateral DC/DC converter 4. Now, the relay 9 will be described. When the fuel cell 1 generates no power, the bilateral DC/AC inverter 5 is stopped and the relay 9 is closed, thereby supplying power directly from the secondary battery 2 to the auxiliary-devised power source 6. Thus, a possible power loss occurring in the bilateral DC/DC converter 4 can be avoided when the fuel cell 1 generates no power, as described with reference to FIG. 2.

Referring to FIG. 5, a third example of the power conversion system according to the present invention will be described. In comparison with FIG. 1 of the first example of the power conversion system, the third example is different from the first one in that a relay 10 and a rectifier 11 are provided in parallel with the bilateral DC/AC inverter 5 and the switch means 7 and that a comparator 13 is added. In the third example, when the charging quantity in the secondary battery 2 decreases, power is supplied directly from the commercial AC power source 8 to the auxiliary-devised power source 6.

When the fuel cell 1 generates no power, the comparator 13 detects the charging quantity 12 in the secondary battery 2 and compares this detected quantity with a predetermined charging quantity threshold 14. When the charging quantity 12 is less than the charging quantity threshold 14, the relay 10 is closed. The power from the commercial AC power source 8 is supplied via the relay 10 to the rectifier 11, thereby rectifying the AC power to a DC power, which is then supplied to the auxiliary-devised power source 6. When the charging quantity 12 is not less than the charging quantity threshold 14, the relay 10 opens.

FIGS. 6A and 6B show changes in the input voltage to the auxiliary-devised power source 6 when the fuel cell 1 generates no power in the third example of the power conversion system. A solid line curve 12 in FIG. 6A represents the charging quantity from the secondary battery 2 and a broken line 14 represents the charging quantity threshold. A solid line 201 in FIG. 6B represents the input voltage to the auxiliary-devised power source 6; and broken lines 202 and 203 denote the AC amplitude and output voltage of the commercial AC power source 8 and the secondary battery 2, respectively.

Initially, the system is in the third mode in which the fuel cell 1 generates no power. In this case, the input voltage 201 to the auxiliary-devised power source 6 is less than the output voltage 203 from the secondary battery 2. When the charging quantity 12 in the secondary battery 2 decreases to a value of less than the predetermined charging quantity threshold 14, the relay 10 is closed. Thus, the input voltage 201 to the auxiliary-devised power source 6 includes a voltage obtained by rectifying the output from the commercial AC power source 8, and the system then shifts to the mode 2.

The reason why the input voltage 201 to the auxiliary-devised power source 6 is slightly lower than the AC amplitude 202 of the commercial AC power source 8 is due to a loss occurring in the rectifier 11. According to the example 3, even when the charging quantity in the secondary battery 2 decreases and hence the secondary battery 2 becomes undischargeable, the supply of power to the auxiliary-devised power source 6 continues.

While the first, second and third examples of the power conversion systems according to the present invention are illustrated as relating to the fuel cell systems, the present invention is also applicable to all the possible power conversion systems with distributed power sources where a power loss occurs in the startup and in the wait state thereof such as a gas turbine, a gas engine, a micro gas turbine, a micro gas engine, a solar generator and a wind power generator.

It should be further understood by those skilled in the art that although the foregoing description has been made on embodiments of the invention, the invention is not limited thereto and various changes and modifications may be made without departing from the spirit of the invention and the scope of the appended claims.

The invention claimed is:

1. A power conversion system comprising:
   a power generating apparatus;
   an auxiliary generation device that consumes a power when the power generating apparatus is started up;
   an auxiliary-devised power source that supplies a desired voltage to the auxiliary generation device;
   a secondary battery device chargeable and dischargeable with power generated by the power generating apparatus;
   a bilateral DC/DC converter connected to the secondary battery device, for controlling charge-discharge of said secondary battery device;
   a bilateral DC/AC inverter that causes the power generating apparatus to cooperate with a commercial AC power source;
   wherein DC terminals of the bilateral DC/AC inverter and inputs of the auxiliary-devised power source are connected to power generating apparatus and the bilateral DC/DC converter;
   wherein the bilateral DC/DC converter is comprised of a circuit to allow passing of discharge current from the secondary battery device when the bilateral DC/DC converter is stopped;
   and wherein when the power generating apparatus generates no power, the bilateral DC/AC inverter and the bilateral DC/DC converter are stopped.

2. The power conversion system of claim 1, wherein the power generating apparatus includes a generator and a DC/DC converter, wherein when the power generating apparatus generates power, the DC/DC converter and the bilateral DC/DC converter output DC voltages of not less than the AC amplitude of the commercial AC power source.

3. The power conversion system of claim 1, wherein the voltage supplied to the auxiliary-devised power source when the power generating apparatus generates no power is lower than the voltage supplied to the auxiliary-devised power source when the power generating apparatus generates power.

4. The power conversion system of claim 1, wherein when the power generating apparatus generates no power, the input voltage to the auxiliary-devised power source is lower than the output voltage from the secondary battery.

5. The power conversion system of claim 1, further comprising a first mode in which the input voltage to the auxiliary-devised power source is greater than the AC amplitude of the commercial AC power source, and a second mode in which the input voltage to the auxiliary-devised power source is not greater than the AC amplitude of the commercial AC power source.

6. The power conversion system of claim 1, wherein when the power generating apparatus generates no power, the power from the commercial AC power source is supplied to the auxiliary-devised power source.

7. The power conversion system of claim 6, further comprising a sensing unit for sensing a charging quantity in the secondary battery, and wherein when the power generating apparatus generates no power and the charging quantity in the secondary battery is smaller than a predetermined threshold, the commercial AC power source supplies power via a rectifier to the auxiliary-devised power source.

8. The power conversion system of claim 1, wherein the power generating apparatus includes a fuel cell.

9. The power conversion system of claim 1, wherein the power generating apparatus includes a solid-state macromolecular type fuel cell.

10. A power conversion system comprising:
    a power generating apparatus;
    an auxiliary generation device that consumes a power when the power generating apparatus is started up;
    an auxiliary-devised power source that supplies a desired voltage to the auxiliary generation device;
    a secondary battery device chargeable and dischargeable with power generated by the power generating apparatus;
    a bilateral DC/DC converter connected to the secondary battery device, for controlling charge/discharge of said secondary battery device;
    a bilateral DC/AC inverter that causes the power generating apparatus to cooperate with a commercial AC power source;
    wherein DC terminals of the bilateral DC/AC inverter and inputs of the auxiliary-devised power source are connected to the power generating apparatus and the bilateral DC/DC converter;

wherein a switch unit for short-circuiting is disposed between the input and the output of the bilateral DC/DC converter; and wherein when the power generating apparatus generates no power, the bilateral DC/AC inverter and the bilateral DC/DC converter are stopped, and said switch unit is closed.

11. The power conversion system of claim 10, wherein the power generating apparatus includes a generator and a DC/DC converter, wherein when the power generating apparatus generates power, the DC/DC converter and the bilateral DC/DC converter output DC voltages of not less than the AC amplitude of the commercial AC power source.

12. The power conversion system of claim 10, wherein the voltage supplied to the auxiliary-devised power source when the power generating apparatus generates no power is lower than the voltage supplied to the auxiliary-devised power source when the power generating apparatus generates power.

13. The power conversion system of claim 10, wherein when the power generating apparatus generates no power, the input voltage to the auxiliary-devised power source is lower than the output voltage from the secondary battery.

14. The power conversion system of claim 10, further comprising a sensing unit for sensing a charging quantity in the secondary battery, and wherein when the power generating apparatus generates no power and the charging quantity in the secondary battery is smaller than a predetermined threshold, the commercial AC power source supplies power via a rectifier to the auxiliary-devised power source.

* * * * *